US011898522B1

(12) United States Patent
Turous et al.

(10) Patent No.: US 11,898,522 B1
(45) Date of Patent: Feb. 13, 2024

(54) INTAKE MANIFOLD FOR INTERNAL COMBUSTION ENGINE, POSITIVE CRANKCASE VENTILATION SYSTEM INCLUDING SAME, AND INTERNAL COMBUSTION ENGINE

(71) Applicant: Honda Motor Co., Ltd., Tokyo (JP)

(72) Inventors: Jeremy G. Turous, Columbus, OH (US); Yuta Abe, Dublin, OH (US); Tetsuji Furukawa, Dublin, OH (US); Alpeshkumar Patel, Marysville, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 18/125,862

(22) Filed: Mar. 24, 2023

(51) Int. Cl.

| | |
|---|---|
| ***F02M 35/116*** | (2006.01) |
| ***F02M 35/10*** | (2006.01) |
| ***F01M 13/00*** | (2006.01) |
| ***F02B 75/22*** | (2006.01) |
| *F01M 13/04* | (2006.01) |

(52) U.S. Cl.
CPC .......... *F02M 35/116* (2013.01); *F01M 13/00* (2013.01); *F02B 75/22* (2013.01); *F02M 35/10222* (2013.01); *F02M 35/10262* (2013.01); *F01M 2013/0461* (2013.01)

(58) Field of Classification Search
CPC ..... F01M 2013/0038; F01M 2013/005; F01M 13/00; F01M 13/0416; F01M 35/116; F02M 35/1022; F02M 35/10222; F02M 35/116
See application file for complete search history.

(56) References Cited

U.S. PATENT DOCUMENTS

| | | | | |
|---|---|---|---|---|
| 7,089,921 | B2 | 8/2006 | Matsuoka et al. | |
| 9,273,650 | B2 | 3/2016 | Born et al. | |
| 9,470,190 | B2 | 10/2016 | Newman et al. | |
| 10,364,777 | B2 | 7/2019 | Murakami et al. | |
| 10,830,193 | B2 | 11/2020 | Enami et al. | |
| 10,871,092 | B2 | 12/2020 | Ishikawa | |
| 11,421,578 | B1 * | 8/2022 | Langenfeld | F02M 35/10157 |
| 2010/0225106 | A1 | 9/2010 | Newman et al. | |

(Continued)

FOREIGN PATENT DOCUMENTS

| | | | |
|---|---|---|---|
| CN | 101994618 | B | 3/2013 |
| CN | 207598314 | U | 7/2018 |
| CN | 209586554 | U | 11/2019 |

*Primary Examiner* — John Kwon
(74) *Attorney, Agent, or Firm* — KENEALY VAIDYA LLP

(57) ABSTRACT

The disclosed subject matter includes an intake manifold for an internal combustion engine that can have a labyrinth structure located therein configured to cause fluids, such as blow-by from engine exhaust, to move in a non-linear direction. The intake manifold can have a plenum including an inlet opening, a plurality of runners, each of the runners extending from the plenum and including a first end opened to the plenum and a second end configured to be connected to the internal combustion engine, and a ventilation chamber, the ventilation chamber extending along each of the runners. The ventilation chamber can include a plurality of ports spaced along the ventilation chamber, each port opens into a respective one of the runners, and a labyrinth inside the ventilation chamber and extending across the ventilation chamber.

20 Claims, 6 Drawing Sheets

(56) References Cited

U.S. PATENT DOCUMENTS

| | | | | |
|---|---|---|---|---|
| 2014/0216387 | A1* | 8/2014 | Kulkarni | F02M 35/112<br>123/184.47 |
| 2018/0266372 | A1* | 9/2018 | Schallauer | B29C 65/06 |
| 2019/0219011 | A1* | 7/2019 | Wicks | B33Y 10/00 |
| 2019/0219012 | A1 | 7/2019 | Wicks | |
| 2021/0148311 | A1* | 5/2021 | Murugesan | F01D 25/28 |
| 2021/0172411 | A1* | 6/2021 | Itagaki | F02M 26/44 |

* cited by examiner

INTAKE MANIFOLD FOR INTERNAL COMBUSTION ENGINE, POSITIVE CRANKCASE VENTILATION SYSTEM INCLUDING SAME, AND INTERNAL COMBUSTION ENGINE

BACKGROUND

The disclosed subject matter relates to an intake manifold for an internal combustion engine. More particularly, the disclosed subject matter relates to methods and apparatus that can reduce or prevent ingestion of pooled condensation in a blow-by gas ventilation chamber of the intake manifold.

Various fluids, such as unburnt fuel, exhaust gases, and/or oil mist can leak past the piston rings during operation of an internal combustion engine and collect in the engine crankcase. This fluid mixture of fuel, gases and oil can be referred to as blow-by gas. The blow-by gas can be recirculated into the combustion chambers of the engine to reduce or eliminate undesirable emissions.

An electronic control unit (also referred to as an ECU, an engine ECU, a controller, a microprocessor, or a processor) can monitor operations of the engine and vary the timing of the spark, the operation of the intake valves and/or exhaust valves, and/or the operation of fuel injectors based on any one or more predetermined variables such as, but not limited to, engine load, ambient temperature, coolant temperature. throttle position, air/fuel ratio, and air mass flow rate. The ECU can monitor events such as, but not limited to, engine speed and misfires and set a predetermined engine speed or power output to mitigate against damage to the engine that can result from one or more of these events.

A misfire can occur when most of or all of the fuel supplied to an individual cylinder fails to ignite. A misfire can be caused by various circumstances, including a malfunctioning spark plug, a malfunctioning fuel injector, or an excessive volume of water (in a liquid or vapor state) ingested into the combustion chamber. The ECU can be configured to disable one or more cylinders or limit the amount of fuel injected into each cylinder when a predetermined number of misfire events are detected. This operation by the ECU can be referred to as a limp home mode. The limp home mode can permit continued operation of the engine at a reduced speed and/or power output for a predetermined time period so that the operator of the vehicle can reach a service facility or other adequate destination so that the cause of the misfire events can be fully diagnosed and corrected.

SUMMARY

Some embodiments are directed to an intake manifold for an internal combustion engine that can have a labyrinth structure located therein configured to cause fluids, such as blow-by gases from combustion, to move in a non-linear direction. The intake manifold can have a plenum including an inlet opening, a plurality of runners, each of the runners extending from the plenum and including a first end opened to the plenum and a second end configured to be connected to the internal combustion engine, and a ventilation chamber, the ventilation chamber extending along each of the runners. The ventilation chamber can include a plurality of ports spaced along the ventilation chamber, each port opens into a respective one of the runners, and a labyrinth inside the ventilation chamber and extending across the ventilation chamber.

Some embodiments are directed to an intake manifold for an internal combustion engine that can include: a plenum including an inlet opening; a plurality of runners, each of the runners extending from the plenum and including a first end opened to the plenum and a second end configured to be connected to the internal combustion engine, each of the runners including an outer surface; and a ventilation chamber, the ventilation chamber protruding from and extending along each of the runners. The ventilation chamber can include, a bottom surface that includes a plurality of valleys and a plurality of peaks, each of the valleys is located between a respective pair of the peaks, a plurality of ports, each of the ports is located on a respective one of the peaks and opens into a respective one of the runners, and a labyrinth extending across the ventilation chamber, the peaks and the valleys forming a portion of the labyrinth, the labyrinth configured to cause fluid entering the ventilation chamber from the inlet to move in a non-linear path within the ventilation chamber.

Some embodiments are directed to an intake manifold for an internal combustion engine, that can include: a plenum including an inlet opening; a plurality of runners, each of the runners extending from the plenum and including a first end opened to the plenum and a second end configured to be connected to the internal combustion engine, each of the runners including an outer surface; and a plurality of ports, each of the ports opening into a respective one of the runners; a perimeter wall protruding from the outer surface of the runners and surrounding the ports; a bottom surface encircled by the perimeter wall and including, a plurality of peaks, each of the peaks is formed by a portion of the outer surface of a respective one of the runners, and a plurality of valleys, each of the valleys is located between a respective pair of the peaks; a cover adjacent the perimeter wall and opposing the bottom surface, the cover including an inner surface; and a plurality of projections protruding from one of the inner surface and the bottom surface, wherein the peaks, the valleys, and the projections form a labyrinth that extends across a ventilation space bound by the bottom surface, the perimeter wall and the cover.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
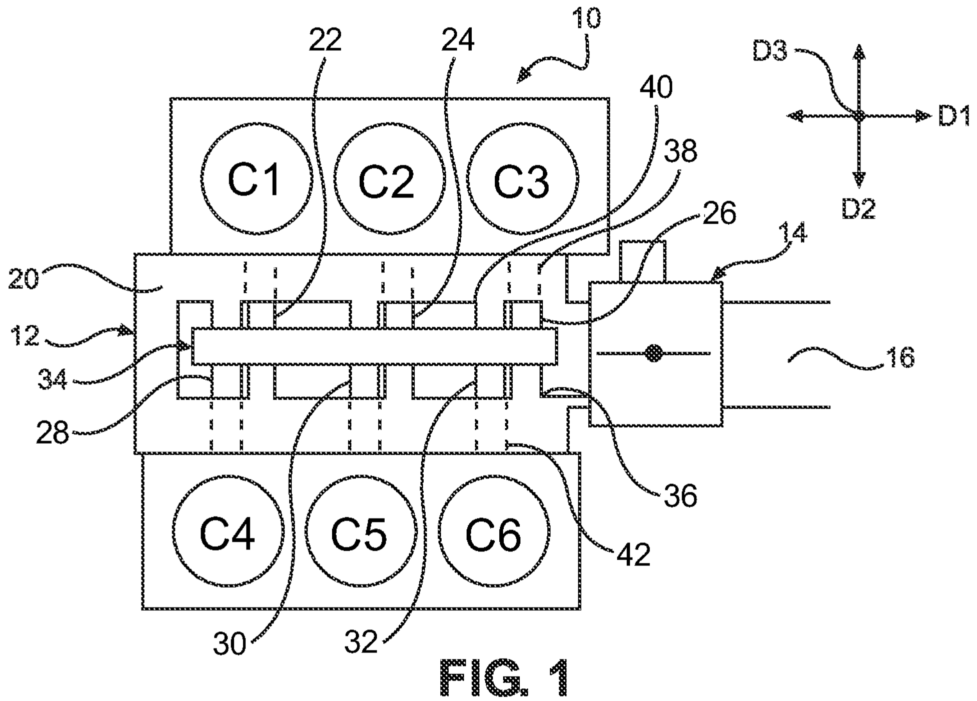
FIG. 1 is a schematic plan view of an internal combustion engine made in accordance with principles of the disclosed subject matter.
Figure 2:
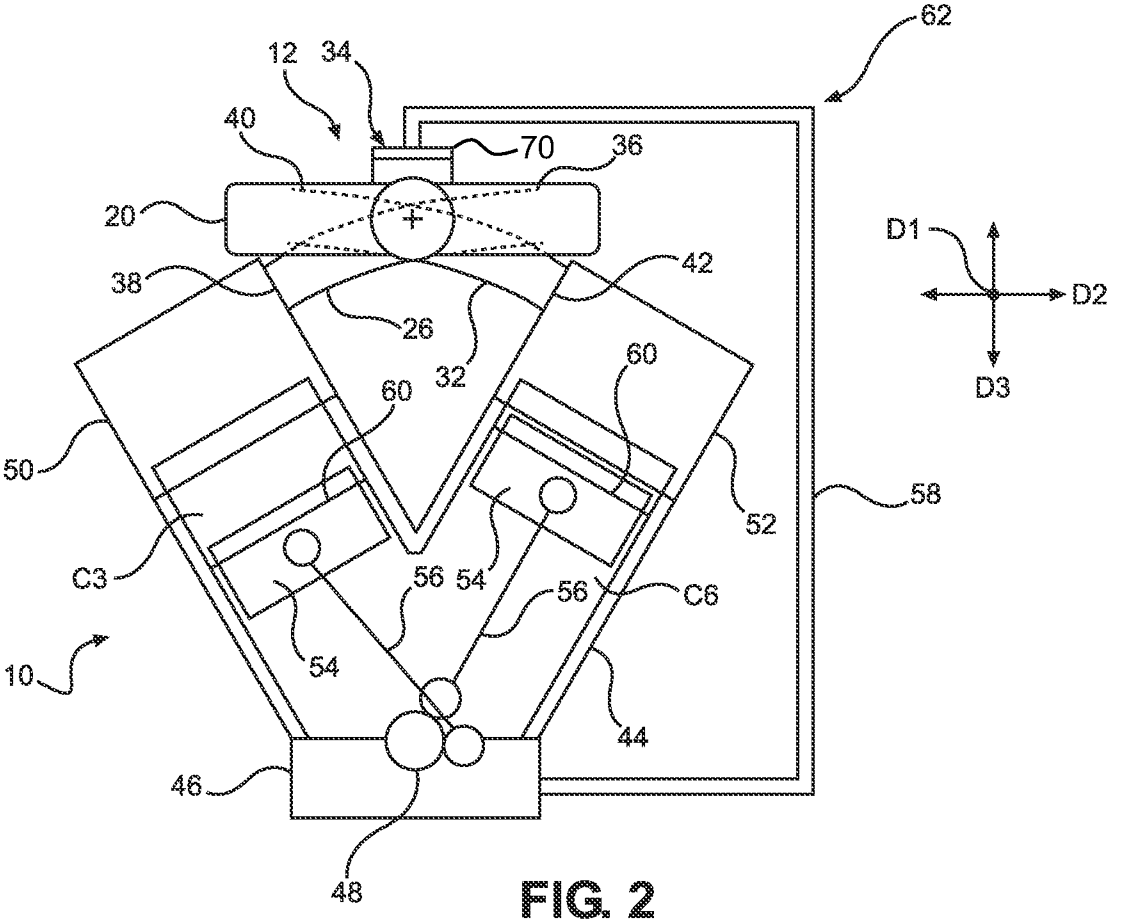
FIG. 2 is a schematic end view of the engine of FIG. 1.

FIGS. 1 and 2 schematically illustrate an embodiment of an internal combustion engine ("engine") 10 made in accordance with principles of the disclosed subject matter. The engine 10 can be a spark-ignition engine (also referred to as a gasoline engine) or a compression-ignition engine (also referred to as a diesel engine). The engine 10 can include a plurality of cylinders C1-C6 that are arranged in a single row (also referred to as an in-line engine or an inline engine) or in multiple rows. The multiple rows (also referred to as banks) can be arranged in a V-shape, a W-shape, or in a horizontal configuration (also referred to as a flat engine, a horizontally opposed engine, or a boxer engine). The engine 10 can include an odd number of cylinders or an even number of cylinders. The engine 10 of FIGS. 1 and 2 can include six cylinders C1-C6 in two banks arranged in a V-shape. The engine 10 of this exemplary embodiment can be referred to as a V-6 engine.

The engine 10 can extend in a first direction D1, a second direction D2 and a third direction D3. The directions D1, D2, D3 can be orthogonal to each other. The first direction D1 can correspond to a longitudinal direction of a vehicle or a transverse direction of the vehicle. The second direction D2 can correspond to the transverse direction when the first direction D1 corresponds to the longitudinal direction of the vehicle and correspond to the longitudinal direction of the vehicle when the first direction D1 corresponds to the transverse direction. The third direction D3 can correspond a vertical direction of the vehicle. In alternate embodiments the third direction D3 can be at an angle with respect to the vertical direction of the vehicle.

The engine 10 can include an intake manifold 12, a throttle body 14, and an air inlet 16. The throttle body 14 can include a throttle valve 18 that can selectively vary fluid communication between the air inlet 16 to the manifold 12 to effect a corresponding change in engine speed. The throttle body 14 is omitted from FIG. 2 for clarity and simplicity of the drawing.

The manifold 12 can include a plenum 20, a plurality of runners 22, 24, 26, 28, 32, and a ventilation chamber 34. The plenum 20 can be a hollow conduit that extends from the throttle body 14 and encircles the runners 22, 24, 26, 28, 30, 32. Each of the runners 22, 24, 26, 28, 30, 32 can be in fluid communication with the plenum 20, the ventilation chamber 34 and a respective of one of the cylinders C1-C6.

The plenum 20 can supply air to each of the runners 22, 24, 26, 28, 30, 32 that passes through the throttle body 14 and enters the plenum 20. A respective one of the runners 22, 24, 26, 28, 30, 32 can supply air to a respective one of the cylinders C1-C6. In alternate embodiments of the engine 10, each of the runners 22, 24, 26, 28, 30, 32 can supply fuel, in addition to air, to the respective cylinder C1-C6. The phantom arrows in FIG. 1 show the direction of airflow for each of the runners 22, 24, 26, 28, 230, 32.

The runners 22, 24, 26, 28, 30, 32 can extend in the second direction D2 and can be spaced along the first direction D1. The second runner 24 can be located between the fourth runner 28 and the fifth runner 30 in the first direction D1. The third runner 26 can be located between the fifth runner 30 and the sixth runner 32 in the first direction D1. The fourth runner 28 can be located between the first runner 22 and the second runner 24 in the first direction D1. The fifth runner 30 can be located between the second runner 24 and the third runner 26 in the first direction D1. That is, the runners 22, 24, 26, 28, 30, 32 can be in an alternating arrangement with each other.

Each of the runners 22, 24, 26, 28, 30, 32 can include a first end connected to the plenum 20 and a second end connected to a respective one of the cylinders C1-C6. For clarity and simplicity of the drawings, only the first end 36 and the second end 38 of the third runner 26 and the first end 40 and the second end 42 of the sixth runner are identified in FIGS. 1 and 2. Each of the first runner 22 and the second runner 24 includes a first end and second end located in the same manner as the first end 36 and the second end 38 of the third runner 26 and each of the fourth runner 28 and the fifth runner 30 includes a first end and second end located in the same manner as the first end 40 and the second end 42 of the sixth runner 32.

Referring to FIG. 2, the first ends 36, 40 of the runners 22, 24, 26, 28, 30, 32 can be located at an elevation in the third direction D3 that is higher than an elevation for the second ends 38, 42 of the runners 22, 24, 26, 28, 30, 32. Each of the runners 22, 24, 26, 28, 30, 32 can be arcuate conduits. In alternative embodiments, each of the runners 22, 24, 26, 28, 30, 32 can be straight conduits.

The engine 10 can include a cylinder block 44, a crankcase 46, crankshaft 48, a pair of cylinder heads 50, 52, a plurality of pistons 54, a plurality of connecting rods 56 and a crankcase ventilation conduit 58. The crankshaft 48 can be rotatably supported by the engine block 44 and the crankcase 46. A respective one of the pistons 54 can be held in a respective one of the cylinders C1-C6. A respective one of the connecting rods 56 can connect a respective one of the pistons 54 to the crankshaft 48.

Each piston 54 can include at least one piston ring 60 that can seal a space between the piston 54 and the wall of the respective one of the cylinders C1-C6. During operation of the engine 10, intake air, unburnt fuel and exhaust gas can leak past the piston ring(s) 60 and enter the crankcase 46. This leaking fluid can be referred to as blow-by gas or blow-by. This blow-by gas can leak from the crankcase and enter the ambient environment as undesirable pollution.

In an effort to reduce or prevent blow-by gas from adversely polluting the ambient environment, the engine 10 can include a positive crankcase ventilation system ("PCV") 62. The PCV 62 can also be referred to as a crankcase ventilation system or a closed crankcase ventilation ("CCV") system. The PCV 62 can include the crankcase ventilation conduit 58 and the ventilation chamber 34. The conduit 58 can be in fluid communication with the crankcase 46 and the chamber 34 and the chamber 34 can be in fluid communication with each of the runners 22, 24, 26, 28, 30, 32 such that blow-by gas in the crankcase 46 can be drawn into the cylinders C1-C6 during the intake stroke of each of the pistons 54. The unburnt fuel in the blow-by gas can be burned in the next power stroke of the each of the pistons 54 and the remaining blow-by gas ingested in each of cylinders C1-C6 can be exhausted from the engine 10 into a catalytic converter for treatment that reduces or eliminates undesirable pollutants that would otherwise enter the ambient environment. Thus, the PCV 62 can reduce undesirable emissions as compared to an engine that does not include the PCV 62.

Figure 3:
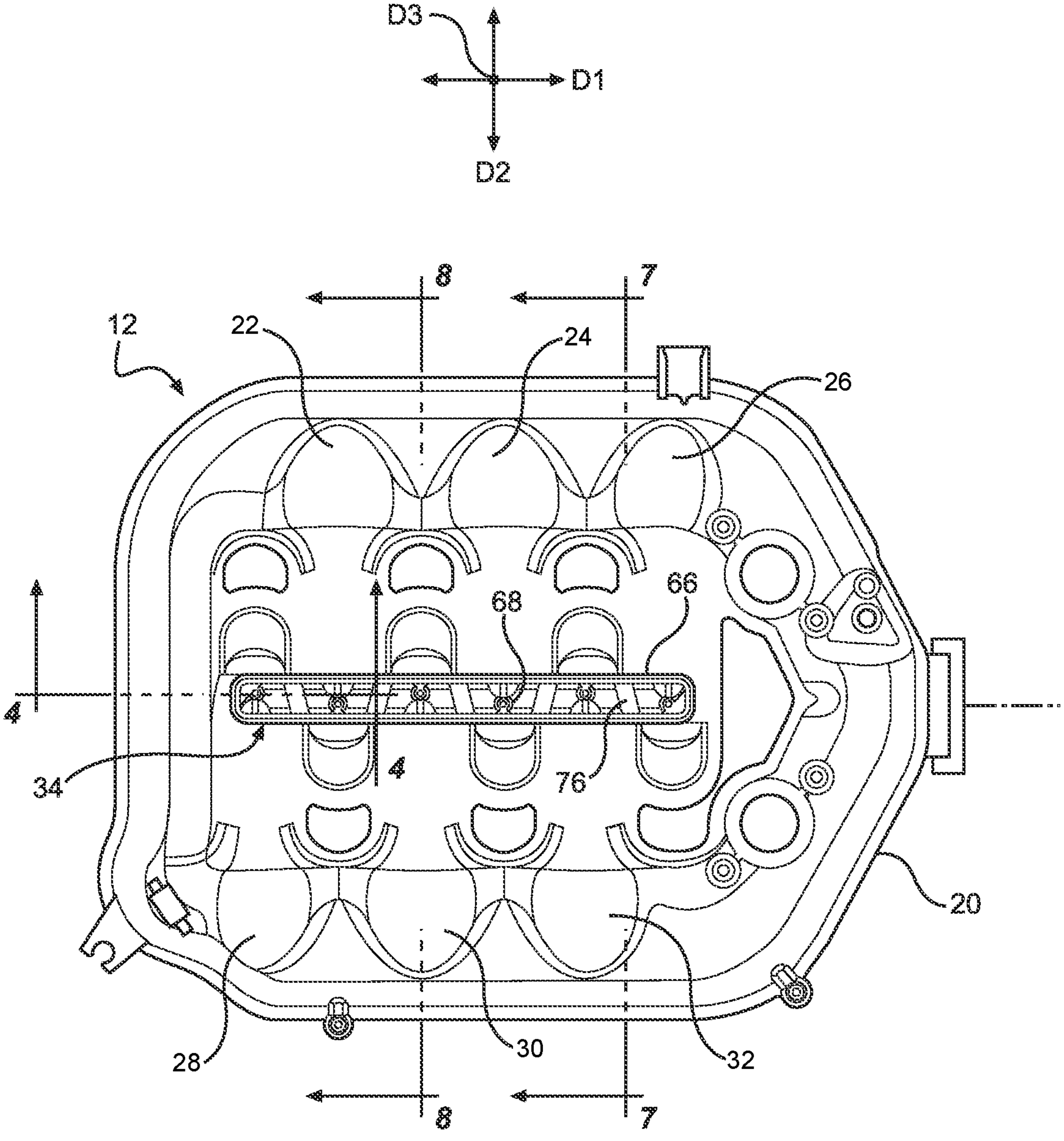
FIG. 3 is a plan view of an intake manifold of the engine of FIG. 1 with a cover omitted to expose interior structure of a ventilation chamber.

The blow-by gas that passes through the ventilation chamber 34 can be referred to as PCV gas. Referring to FIG. 3, the ventilation chamber 34 can be located along a central portion of the intake manifold 12 with respect to the first direction D1 and the second direction D2. This central location of the chamber 34 can be advantageous when the engine 10 is configured as a V-6 engine. The centrally located chamber 34 can provide an equal distribution of the PCV gas to each of the cylinders C1-C6. This equal distribution of the PCV gas can avoid an adverse impact on engine calibration.

Figure 4:
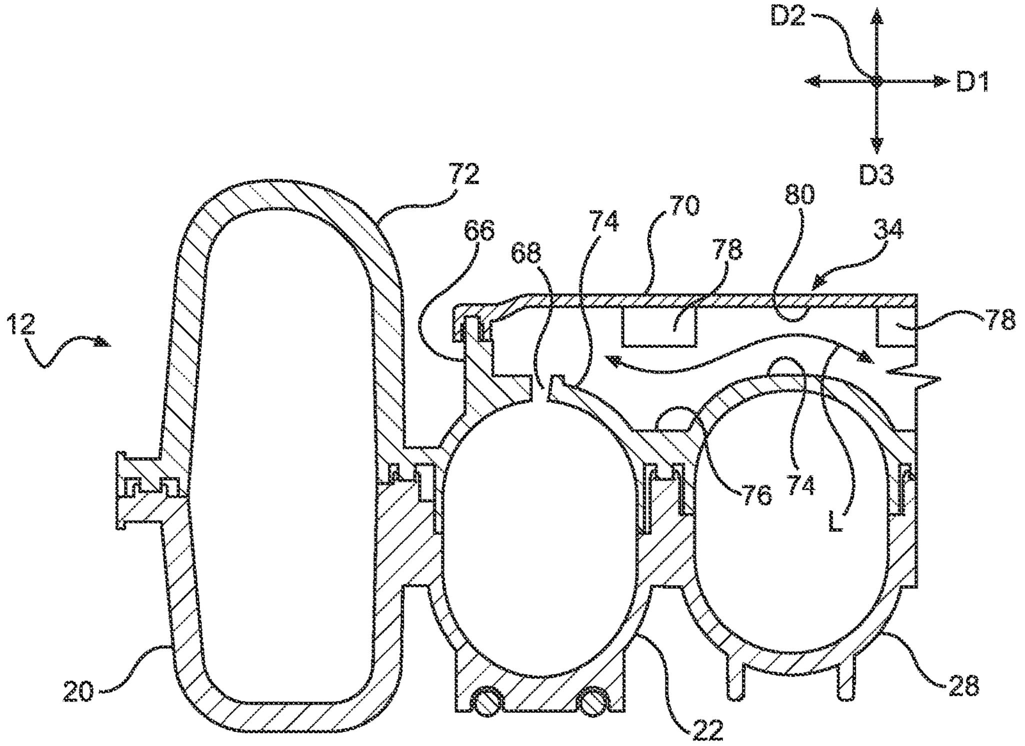
FIG. 4 is a cross-sectional view along line 4-4 of FIG. 3 with the cover of the ventilation chamber connected to the intake manifold.
Figure 5:
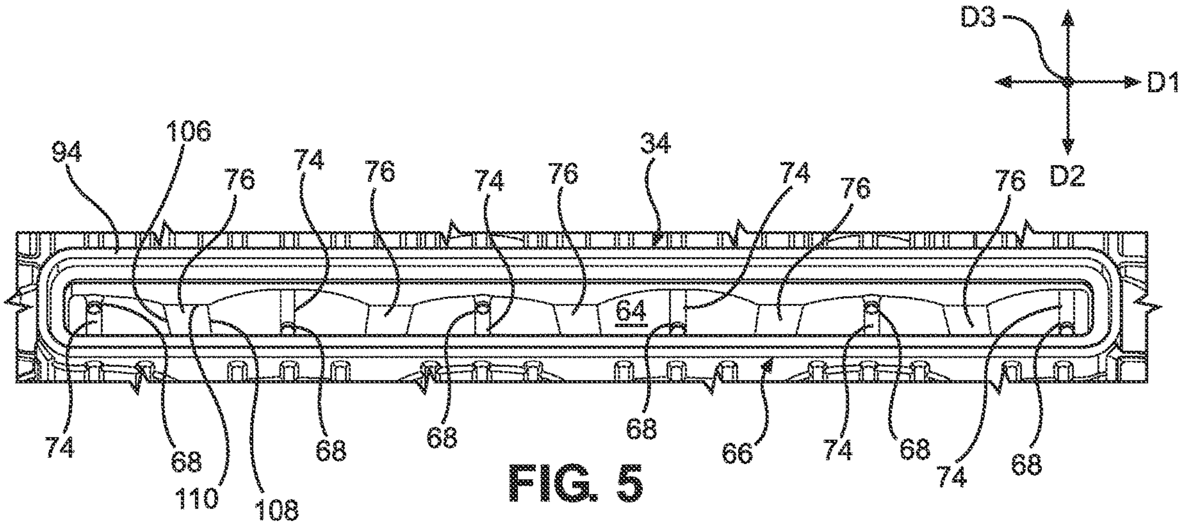
FIG. 5 is top perspective view of an enlarged portion of FIG. 3 showing the interior structure of the ventilation chamber of the intake manifold.

Referring to FIGS. 4 and 5, the ventilation chamber 34 can include a bottom surface 64, a perimeter wall 66 that surrounds the bottom surface 64, a plurality of ports 68 passing through the bottom wall 64, and a cover 70. The bottom surface 64 can be an undulating surface that is formed by the shape and spacing of the runners 22, 24, 26, 28, 30, 32. The bottom surface 64 can be a portion of an outer surface 72 of the intake manifold 12. The cover 70 is omitted from FIGS. 3 and 5 to more clearly show the interior of the chamber 34.

The shape and spacing of the runners 22, 24, 26, 28, 30, 32 can create a plurality of peaks 74 on each plurality of valleys 76 between adjacent pairs of the runners 22, 24, 26, 28, 30, 32 in the first direction D1. The alternating relationship of the peaks 74 and the valleys 76 can create the undulating bottom surface 64. A respective one of the ports 68 can be located on a respective one of the peaks 74.

Water vapor can be a constituent of the PCV gas that is recirculated into the cylinders C1-C6. The temperature of the blow-by gas in the crankcase 46 can be high enough that the water can be in a gas state regardless of the ambient temperature. Due to the location of the intake manifold on the tip of the engine 10, the temperature inside the ventilation chamber 34 can be low enough for the water in the PCV gas to condense in the ventilation chamber 34 when the engine 10 operates in a relatively cold ambient environment. The condensed water can accumulate in each of the valleys 76 inside the chamber 34 and be ingested by any of the cylinders C1-C6 during the intake stroke of the piston(s) 54. Generally, the ingested condensed water might not adversely impact the efficiency of the combustion process of the engine 10. However, conditions can arise in which an undesirable volume or flow rate of the condensed water is ingested by one or more of the cylinders C1-C6.

For example, the volume of water condensing in the ventilation chamber 34 can increase over time as the engine 10 operates. When the driver inputs a sudden acceleration load (from acceleration, braking or turning) the condensed water can slosh inside the chamber 34, and be consumed in a short amount of time by one or more of the cylinders C1-C6, leading to misfire and potentially limp-home mode. The negative pressure created by the intake strokes of the pistons 54 can draw the condensed water that has been displaced toward the port(s) 68 into one or more of the cylinders C1-C6. The ingested water can cause the one or more cylinders C1-C6 to misfire if the ingested water is greater than or equal to a threshold volume or a threshold flow rate.

The engine ECU can be configured to monitor the engine 10 for a misfire event and track the number of misfire events that occur within a predetermined time period. An accumulation of misfire events above a predetermined threshold within a predetermined time period can adversely impact any one of the efficiency, emissions, reliability and durability of the engine 10. The engine ECU can be configured to operate the engine 10 in the limp-home mode when the number of misfire events exceeds a predetermined threshold within the predetermined time period. Operating the vehicle in a relatively humid environment can cause the number of misfire events to exceed the predetermined thresholds without any failure or malfunction of the components or systems of the engine 10.

Misfire events caused by malfunctioning component(s) of the engine 10 can be diagnosed and corrected. However, diagnostics and corrective maintenance might not address misfire events that are caused by ingesting an undesirable amount of condensed water that has accumulated in the ventilation chamber 34. Nonetheless, the ECU can be configured to operate the engine in limp-home mode without distinguishing between the causes of the misfire events. The driver (or owner) of the vehicle can experience a negative perception of the vehicle if the driver/owner experiences more than one operation of the engine 10 in the limp-home mode that is caused by undesirable ingestion of condensed water from the ventilation chamber 34.

Thus, it can be desirable to provide the ventilation chamber 34 with diversion features inside the chamber 34 that diverts the accumulated condensed water in the valleys 76 away from the ports 68 or limits the flow rate of the condensed water flowing through the port(s) 68 to be less than a predetermined flow rate. The diversion features can include one or more blockers, one or more walls, one or more projections, or any combination of blockers, walls and projections.

FIGS. 3-8 show a first embodiment of exemplary diversion features that can form a labyrinth. The labyrinth can include the undulating bottom surface 64, an inner surface 80 of the cover 70 and a plurality of projections 78 that protrude from the inner surface 80 of the cover 70. The inner surface 80 of the cover 70 can be referred to as a top surface of the ventilation chamber 34. The inner surface 80 can oppose and be spaced away from the bottom surface 64 in the third direction D3. The size and shape of the projections 78 are exaggerated and schematically illustrated in FIG. 4 to emphasize the labyrinth formed by the surfaces 64, 80 and the projections 78.

The projections 78 can be aligned with the valleys 76 in the first and second directions D1, D2 and overlap the valleys 76 in the third direction D3. That is, the projections 78 can alternate with the peaks 74 in the first direction D1 such that a respective one of the projections 78 is located between a respective pair of the peaks 74 in the first direction D1. As shown in FIG. 4, the alternating arrangement of the peaks 74, valleys 76 and projections 78 can create a labyrinthine path L that extends along the first direction D1.

Water in the PCV gas can condense inside the ventilation chamber 34 and pool on any or all of the valleys 76. The labyrinthine path L can represent a longer travel path for the condensed water from the valley 76 to any of the ports 68 as compared to a ventilation chamber that does not include the projections 78. Further, the projections 78 can function as blockers that obstruct at least some of the flow of the sloshing condensed water toward any of the ports 68 and/or redirect at least some of the flow of the sloshing condensed water away from the any of the ports 68.

Figure 6:
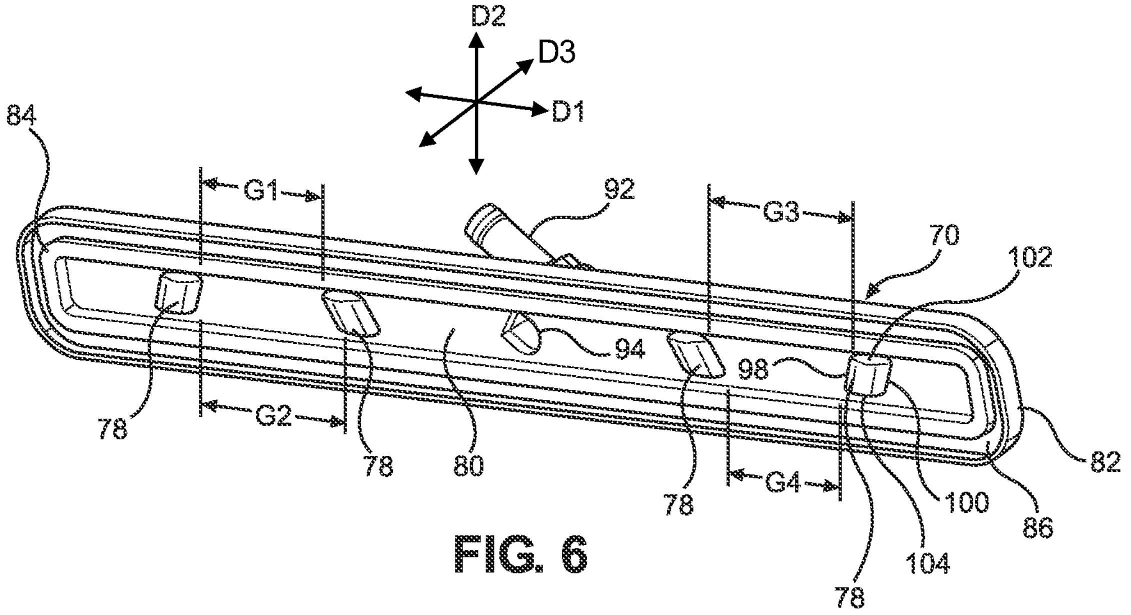
FIG. 6 is bottom perspective view of the cover shown FIG. 4.
Figure 7:
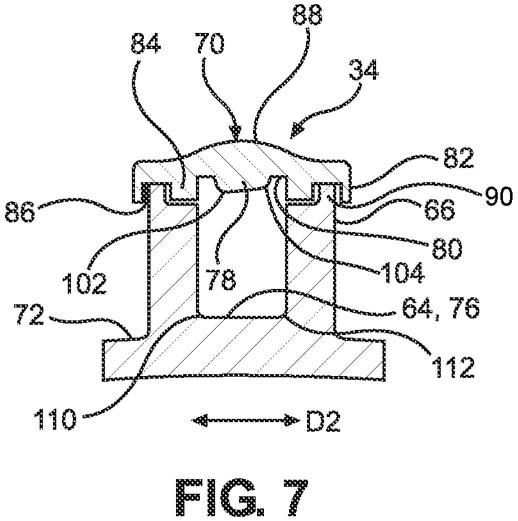
FIG. 7 is a cross-sectional view along line 7-7 of FIG. 3 with the cover of the ventilation chamber connected to the intake manifold.
Figure 8:
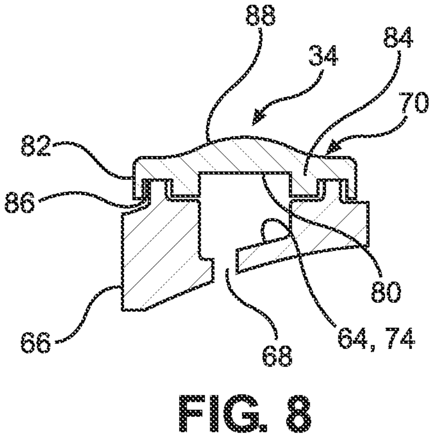
FIG. 8 is a cross-sectional view along line 8-8 of FIG. 3 with the cover of the ventilation chamber connected to the intake manifold.

Referring to FIGS. 6-8, the cover 70 can include an outer wall 82, an inner wall 84, a groove 86 (FIGS. 7 and 8), a top wall 88, a projection 90, a fitting 92 and an inlet port 94. The top wall 88 can include the inner surface 80 and the inner wall 84 can surround the inner surface 80. The outer wall 82 and the inner wall 84 can extend from the top wall 88 in the third direction D3. The outer wall 82 can surround the inner wall 84 and be spaced away from the inner wall 84 by the groove 86. The groove 86 can be located between the outer wall 82 and the inner wall 84.

Referring to FIG. 6, each of the projections 78 can have a parallelogram shape and that terminates on the inner surface 80 at a pair of rounded edges 98, 100 and a pair of rounded ends 102, 104. The edges 98, 100 can extend in a direction that is oblique to each of the first direction D1 and the second direction D2. The ends 102, 104 can extend from and be connected to both of the edges 98, 100. The ends 102, 104 can extend in the first direction D1 or be substantially parallel to the first direction D1 such that one of ordinary skill in the art would perceive the ends 102, 104 as being parallel to the first direction D1.

The pair of projects 78 to the left of the inlet port 94 can converge toward each other in the second direction D2 such that the first ends 102 are spaced apart by a first gap G1 and the second ends 104 are spaced apart by a second gap G2. The second gap G2 can be larger than the first gap G2 when measured in the first direction D1.

The pair of projects 78 to the right of the inlet port 94 can diverge away from each other in the second direction D2 such that the first ends 102 are spaced apart by a third gap G3 and the second ends 104 are spaced apart by a fourth gap G4. The fourth gap G2 can be smaller than the third gap G3 when measured in the first direction D1. The third gap G3 can be the same size as the second gap G2 and the fourth gap G4 can be the same size as the first gap G1 when measured in the first direction D1.

The ends 102, 104 can be spaced away from the inner wall 84 in the second direction D2. Thus, each of the projections 78 can be smaller when measured in the second direction D2 than the respective valley 76 when measured in the second direction D2.

Referring to FIG. 7, each of the projections 78 can include a surface that faces or opposes the bottom surface 64 of the ventilation chamber 34. The opposing surface can be non-parallel to the second direction D2 and the top surface 80.

The projection 90 can have an annular shape. The perimeter wall 66 can include the annular projection 90.

The fitting 92 can be connected to the crankcase ventilation conduit 58 in any appropriate manner. The fitting 92 can be in fluid communication with the conduit 58 such that PCV gas can flow from the conduit 58 into the fitting 92.

The inlet port 94 can pass through the top wall 88 and can be in fluid communication with the fitting 92 and the interior of the ventilation chamber 34 such that PCV gas in the fitting 92 can flow through the inlet port 94 and into the interior of the ventilation chamber 34.

Returning to FIG. 5, each of the valleys 76 can have a parallelogram shape that terminates at a pair of long edges 106, 108 and a pair of short edges 110, 112. The second short edge 112 (see FIG. 7) is obstructed from view in FIG. 5 by the perimeter wall 66. The long edges 106, 108 can extend in a direction that is oblique to each of the first direction D1 and the second direction D2. The short edges 110, 112 can extend from and be connected to both of the long edges 106, 108. The short edges 110, 112 can extend in the first direction D1 or be substantially parallel to the first direction D1 such that one of ordinary skill in the art would perceive the short edges 110, 112 as being parallel to the first direction D1.

A first subset of the ports 68 can be aligned with each other in the first direction D1 and a second subset of the ports 68 can be aligned with each other in the first direction D1. The second subset of the ports 68 can be offset from the first subset of the ports 68 in the second direction. That is, the ports 68 can be offset from each other in the second direction D2. The first subset of ports 68 can be located closer to a first side of the perimeter wall 66 than are the second subset of ports 68 and the second subset of ports 68 can be located closer to a second side of the perimeter wall 66 than are the first subset of ports 68. That is, each of the ports 68 can be spaced away from a centerline of the ventilation chamber 34 that is parallel to the first direction D1.

Thus, the labyrinth formed by the undulating bottom surface 64 and the projections 78 can obstruct and/or redirect condensed water that is sloshing in the ventilation chamber 34 to reduce the volume or flow rate of the condensed water that is ingested in any one of the cylinders C1-C6 to be less than a predetermined value so that proper combustion occurs. However, the undulating bottom surface 64 and the projections 78 are merely exemplary diversion features that can form a labyrinth. Alternate embodiments can include different diversion features such as the diversion features shown in FIGS. 9-14.

FIGS. 9-12 illustrate an alternate embodiment of a ventilation chamber 114 that can be used with the intake manifold 12 instead of the ventilation chamber 34. The chamber 114 can include a second embodiment of exemplary diversion features that can form a labyrinth. The diversion features can include a plurality of projections 116, 118, 120, 122, 124, 126 that protrude from a bottom surface 128 of the chamber 114. The ventilation chamber 114 can include a lid 130 that omits the projections 78 of the diversion features of FIGS. 3-8. The lid 130 is omitted from FIG. 9 to more clearly illustrate the interior of the ventilation chamber 114.

Figure 9:
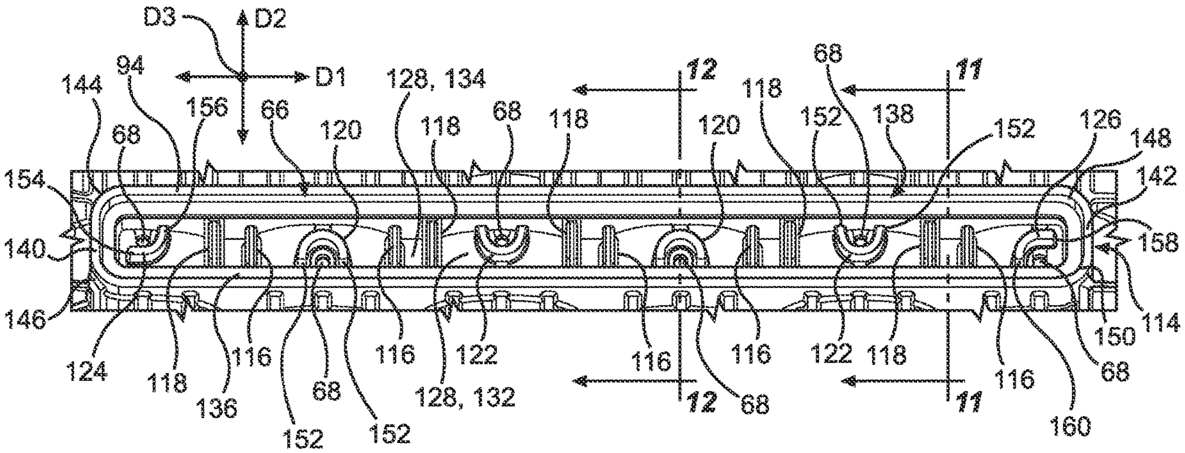
FIG. 9 is a top perspective view of an alternate embodiment of the internal structure of the ventilation chamber of the intake manifold made in accordance with principles of the disclosed subject matter.
Figure 10:
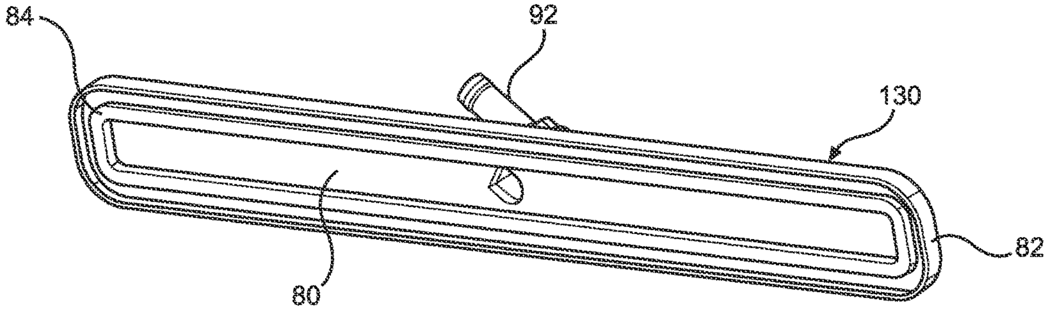
FIG. 10 is a bottom perspective view of a cover for covering the internal structure of the ventilation chamber of FIG. 9.
Figure 11:
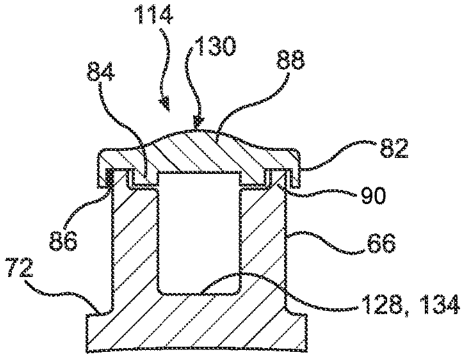
FIG. 11 is a cross-sectional view along line 11-11 of FIG. 9 with the cover of the ventilation chamber connected to the intake manifold.
Figure 12:
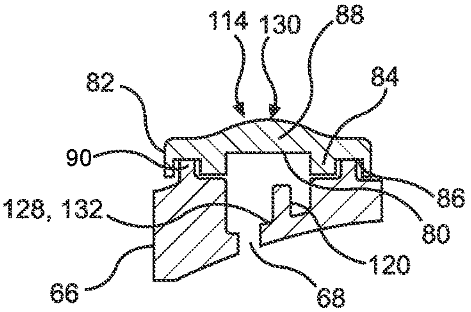
FIG. 12 is a cross-sectional view along line 12-12 of FIG. 9 with the cover of the ventilation chamber connected to the intake manifold.

Referring to FIGS. 9, 11 and 12, the ventilation chamber 114 can include the perimeter wall 66 and the plurality of ports 68 described above with respect to FIGS. 3-8. The bottom surface 128 can include a plurality of peaks 132 a plurality of valleys 134 that are surrounded by the perimeter wall 66. Respective pairs of the projections 116 and respective pairs of the projections 118 can delineate the peaks 132 and respective pairs of the projections 116, 118 can delineate the valleys 134.

The bottom surface 128 can be a portion of the outer surface 72 of the intake manifold 12 as described above with respect to FIGS. 3-8. The bottom surface 128 can be an undulating surface that is formed by the shape and spacing of the runners 22, 24, 26, 28, 30, 32. The projections 116, 118, 120, 122, 124, 126 can form a labyrinthine path that extends along the bottom surface 128.

The projections 116, 118 can be referred to as first projections and have a straight shape. The projections 116, 118 can be elongated in the second direction D2 such that the distance of the projections 116, 118 measured in the second direction D2 is greater than the distance of the projections 116, 118 measured in the first direction D1.

Referring to FIG. 9, the perimeter wall 66 can include a first section 136, a second section 138, a first end 140 and a second end 142. The sections 136, 138 can extend from and be connected to each of the ends 140, 142. The sections 136, 138 can extend in the first direction D1 and the ends 140, 142 can extend in the second direction D2. The junctions of the sections 136, 138 with the ends 142, 144 can include rounded corners 144, 146, 148, 150.

The projections 116 can extend from and abut the first section 136 of the perimeter wall 66. The projections 116 can be spaced away from the second section 138 of the perimeter wall 66 in the second direction D2. Two of the peaks 132 can be located between a pair of the projections 116 in the first direction D1, respectively. One of the peaks 132 can be located between the second end 142 and a respective one of the projections 116.

Figure 13:
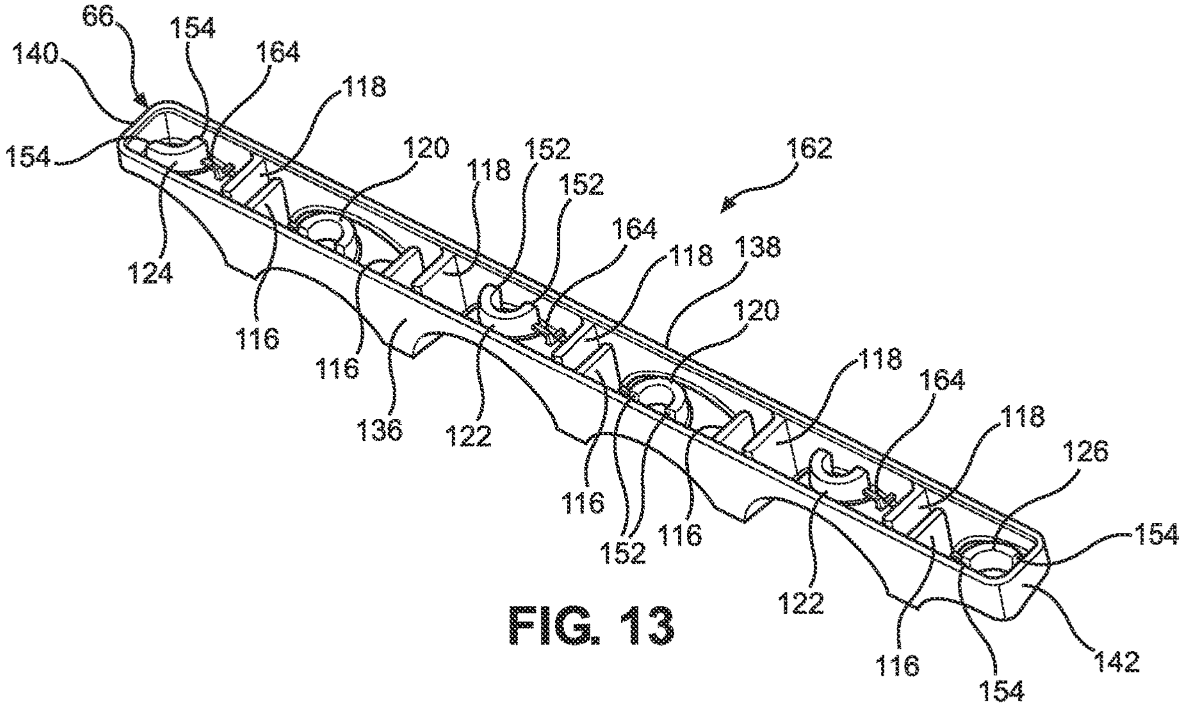
FIG. 13 is a perspective view of an exemplary embodiment in which the perimeter wall and the projections can be molded as a single, homogenous component that is separately formed from the remainder of the intake manifold.
Figure 14:
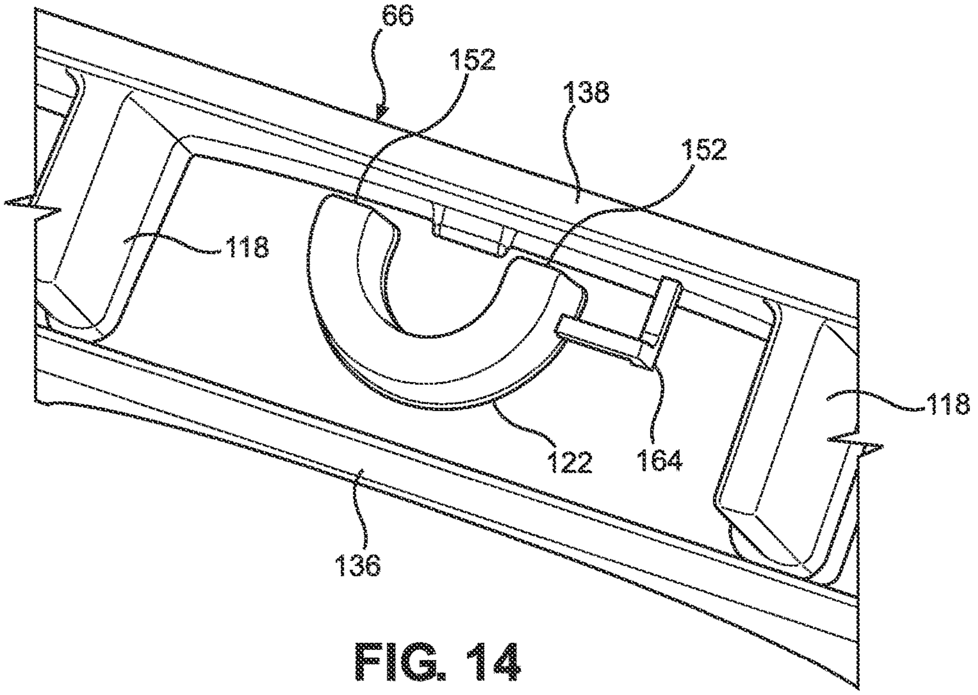
FIG. 14 is an enlarged view of a portion of FIG. 13.

The projections 118 can extend from and abut the second section 138 of the perimeter wall 66. The projections 118 can be spaced away from the first section 136 of the perimeter wall 66 in the second direction D2. FIGS. 13 and 14 more clearly show the projections 118 spaced away from the first section 136. Two of the peaks 132 can be located between a pair of the projections 118 in the first direction D1, respectively. One of the peaks 132 can be located between the first end 140 and a respective one of the projections 118.

A respective one of the valleys 132 can be located between a respective pair of the projections 116, 118 that are adjacent to each other in the first direction D1. Thus, an opening between the end of each of the projections 116 and the second section 138 is offset in the second direction D2 from an opening between the end of the each of the projections 118 and the first section 136 in the second direction D2 at the respective valley 134. These offset openings can create a portion of a labyrinthine path that extends along the bottom surface 128.

A respective one the ports 68 can be located on a respective one of the peaks 132. A first subset of the ports 68 can be offset toward the first section 136 and a second subset of the ports 68 can be offset toward the second section 138. Two of the ports 68 can be located between pairs of the projections 116, respectively, and another two of the ports 68 can be located between pairs of the projections 118, respectively, with the ports 68. The openings between the second section 138 and the respective pair of projections 116 can be offset in the second direction D2 with respect to the location of the respective port 68 and the openings between the first section 136 and the respective pair of projections 118 can be offset in the second direction D2 with respect to the location of the respective port 68. Thus, the projections 116, 118 can obstruct at least a portion of the condensed water that has pooled in any of the valleys 132 from flowing toward any of the ports 68, or redirect at least a portion of the condensed water away from any of the ports 68.

The projections 120, 122, 124, 126 can be referred to as second projections, The projections 120, 122, 124, 126 can have an arcuate shape. The arcuate shape of the projections 120, 122 can be a semi-circular shape and the projections 124, 126 can have an arclength that is less than the arclength of the projections 120, 122. A respective one of the ports 68 can be located between the perimeter wall 66 and a respective one of the projections 120, 122, 124, 126.

Each of the projections 120, 122 can terminate at a pair of ends 152. The ends 152 of the projections 120 can be adjacent to and spaced away from the first section 136 in the second direction D2 so that the projections 120 are opened toward the first section 136 and closed toward the second section 138. The ends 152 of the projections 122 can be adjacent to and spaced away from the second section 138 in the second direction D2 so that the projections 122 are opened toward the second section 138 and closed toward the first section 136. The projections 120 can be spaced away from the second section 138 in the second direction D2 and the projections 122 can be spaced away from the first section 136 in the second direction D2.

The projection 124 can terminate at a pair of ends 154, 156. The first end 154 can be adjacent to and spaced away from the first end 140 of the perimeter wall 66 in the first direction D1 and the second end 156 can be adjacent to and spaced away from the second section 138 so that the projection 124 is opened toward the first corner 144 and closed toward the first section 136 and an adjacent one of the projections 118. A respective one of the ports 68 can be located between the projection 124 and the first corner 144.

The projection 126 can terminate at a pair of ends 158, 160. The first end 158 can be adjacent to and spaced away from the second end 142 of the perimeter wall 66 in the first direction D1 and the second end 160 can be adjacent to and spaced away from the first section 136 so that the projection 126 is opened toward the fourth corner 150 and closed toward the second section 138 and an adjacent one of the projections 116. A respective one of the ports 68 can be located between the projection 126 and the fourth corner 150.

Thus, the peaks 132, the valleys 134 and the projections 116, 118, 120, 122, 124, 126 can form a labyrinthine path that extends along the bottom surface 128 of the ventilation chamber 114. The labyrinth formed by the peaks 132, the valleys 134 and the projections 116, 118, 120, 122, 124, 126 can obstruct and/or redirect condensed water that is sloshing in the ventilation chamber 114 to reduce the volume or flow rate of the condensed water that is ingested in any one of the cylinders C1-C6 to be less than a predetermined value so that proper combustion occurs.

The cover 130 can include the inner surface 80, the outer wall 82, the inner wall 84, the groove 86, the top wall 88, the fitting 92 and the inlet port 94 of the lid 130 described above with respect to FIGS. 6-8.

The perimeter wall 66 of each of the ventilation chambers 34, 114 can be integrally formed on outer surface 72 of the intake manifold 12. Alternate embodiments can include the perimeter wall 66 formed separately and connected onto the outer surface 72 of the intake manifold 12 in any appropriate manner. FIGS. 13 and 14 show an exemplary embodiment in which the perimeter wall 66 and the projections 116, 118, 120, 122, 124, 126 can be molded as a single, homogenous component 162 that is separately formed from the remainder of the intake manifold 12. The component 162 can include a plurality of sprues 164. A respective one of the sprues 164 can connect a respective one of the projections 116, 118, 120, 122, 124, 126 to the perimeter wall 66. The perimeter wall 66 obstructs the sprues 164 of projections 120 from view in FIG. 13, and the projection 126 obstructs the respective sprue 164 from view in FIG. 13.

The mold for the intake manifold 12 can be simplified by fabricating the component 162 separately from the intake manifold 12. Further, the structure and shape of the component 162 can be more intricate as compared to integrally molding the perimeter wall 66 and the projections 116, 118, 120, 122, 124, 126 with the remainder of the intake manifold 12. The component 162 can be configured to be retrofitted onto an intake manifold 12 that is already in-use on an engine 10.

While certain embodiments of the invention are described above, it should be understood that the invention can be embodied and configured in many different ways without departing from the spirit and scope of the invention.

For example, the intake manifold 12 and the diversion structures can be made from any appropriate material such as, but not limited to, metal, plastic, carbon fiber, or a composite of these or any other approximate materials(s).

Although the intake manifold 12 described above can be used with the engine 10 that is configured as a V-6 engine, the intake manifold 12 can be configured for any engine configuration.

Instead of a straight shape, the projections 116, 118 can have any appropriate shape such as, but not limited to, a curved shape, or a shape having linear and curved portions. Further, the projections 116, 118 can extend in a direction that is oblique to the first direction D1 and the second direction D2.

Instead of an arcuate shape, the projections 120, 122 can have any appropriate shape such as, but not limited to, a polygonal shape, or a shape having linear and curved portions.

Instead of forming the component 162 by molding a molten material, the component 162 can be machined from a solid block of material.

The ports 68 can be located at an apex of a peak 132 or can be located off (spaced from) the apex but also off or spaced from an adjacent valley 134.

A method for using the intake manifold can include providing a labyrinth structure located within the intake manifold and causing fluids, such as blow-by gas from combustion, to move in a non-linear direction within the intake manifold in directions that avoid intersection with the ports 68. The method can include providing the intake manifold with a plenum including an inlet opening, a plurality of runners, each of the runners extending from the plenum and including a first end opened to the plenum and a second end configured to be connected to the internal combustion engine, and a ventilation chamber, the ventilation chamber extending along each of the runners. The method can also include providing the ventilation chamber with a plurality of ports spaced along the ventilation chamber, each port opens into a respective one of the runners, and providing the labyrinth inside the ventilation chamber and extending across the ventilation chamber.

What is claimed is:

1. An intake manifold for an internal combustion engine, comprising:

a plenum including an inlet opening;

a plurality of runners, each of the runners extending from the plenum and including a first end opened to the plenum and a second end configured to be connected to the internal combustion engine; and a ventilation chamber, the ventilation chamber extending along each of the runners and includes, a plurality of ports spaced along the ventilation chamber, each port opens into a respective one of the runners, and a labyrinth inside the ventilation chamber and extending across the ventilation chamber.

2. The intake manifold according to claim 1, wherein the ventilation chamber includes a bottom surface and a top surface that opposes the bottom surface, and the labyrinth includes a plurality of projections that protrude from one of the top surface and the bottom surface.

3. The intake manifold according to claim 2, wherein the bottom surface includes a plurality of peaks and a plurality of valleys, the valleys are spaced away from each other in a first direction, each of the valleys is located between a respective pair of the peaks, the peaks and the valleys form a portion of the labyrinth, and a first one of the projections overlaps a first one of the valleys in a second direction that is orthogonal to the first direction.

4. The intake manifold according to claim 1, wherein the ventilation chamber includes a bottom surface and a top surface that opposes the bottom surface, the ports extend through the bottom surface, and the labyrinth includes a plurality projections that protrude from the top surface.

5. The intake manifold according to claim 4, wherein each of the projections includes an opposing surface that faces the bottom surface and is nonparallel to the top surface.

6. The intake manifold according to claim 1, wherein the ventilation chamber includes a bottom surface and a top surface that opposes the bottom surface, the ports extend through the bottom surface, and the labyrinth includes a plurality of projections that protrude from the bottom surface.

7. The intake manifold according to claim 6, wherein the plurality of projections include a plurality of first projections, each of the first projections is straight and located between each respective pair of the ports.

8. The intake manifold according to claim 7, wherein the plurality of projections include a plurality of second projections, each of the second projections is arcuate and located adjacent to a respective one of the ports.

9. A positive crankcase ventilation system for an internal combustion engine having a crankcase and a plurality of cylinders, comprising:

the intake manifold according to claim 1; and a conduit connected to the ventilation chamber and configured to be connected to the crankcase.

10. An internal combustion engine comprising:

an engine block that includes a plurality of cylinders and a crankcase;

the intake manifold according to claim 1, the manifold is connected to each of the plurality of cylinders; and a conduit connected to the ventilation chamber and the crankcase and configured to convey fluid from the crankcase to the ventilation chamber.

11. An intake manifold for an internal combustion engine, comprising:

a plenum including an inlet opening;

a plurality of runners, each of the runners extends from the plenum and includes a first end opened to the plenum and a second end configured to be connected to the internal combustion engine, each of the runners incudes an outer surface; and a ventilation chamber, the ventilation chamber protrudes from and extends along each of the runners, the ventilation chamber includes, a bottom surface that includes a plurality of valleys and a plurality of peaks, each of the valleys is located between a respective pair of the peaks, a plurality of ports, each of the ports is located on a respective one of the peaks and opens into a respective one of the runners, and a labyrinth extending across the ventilation chamber, the peaks and the valleys forming a portion of the labyrinth, the labyrinth configured to cause fluid entering the ventilation chamber from the inlet to move in a non-linear path within the ventilation chamber.

12. The intake manifold according to claim 11, wherein the ventilation chamber includes, a perimeter wall, the perimeter wall protrudes from each of the runners, the bottom surface is surrounded by the perimeter wall, and a cover that abuts the perimeter wall, the cover includes an inner surface spaced away from and opposes the bottom surface, and the labyrinth includes a plurality of projections protruding from one of the bottom surface and the inner surface of the cover.

13. The intake manifold according to claim 12, wherein the plurality of projections protrude from the inner surface and include a sloped surface that is inclined with respect to the inner surface.

14. The intake manifold according to claim 12, wherein each of the valleys includes a flat surface, and each of the projections opposes a respective one of the flat surfaces.

15. The intake manifold according to claim 14, wherein the flat surfaces are spaced away from each other in a first direction, and each of the flat surfaces and the projections have a straight side that extends in a direction that is oblique to the first direction.

16. The intake manifold according to claim 12, wherein the perimeter wall includes a pair of long wall sections that are parallel to and spaced apart from each other and a pair of short wall sections that are connected to each of the long wall sections, the plurality of projections includes, a first plurality of projections that protrude from a first one of the long wall sections and are spaced away from a second one of the long wall sections, and a second plurality of projections that protrude from the second one of the long wall sections and are spaced away from the first long wall section.

17. The intake manifold according to claim 16, wherein the first plurality of projections includes a plurality of first straight projections and a plurality of first arcuate projections, and the second plurality of projections includes a plurality of second straight projections and a plurality of second arcuate projections, and each of the first straight projections is paired with a respective one of the second straight projections, and each paired first and second projections extend along a respective one of the valleys.

18. An intake manifold for an internal combustion engine, comprising:

a plenum including an inlet opening;

a plurality of runners, each of the runners extending from the plenum and including a first end opened to the plenum and a second end configured to be connected to the internal combustion engine, each of the runners including an outer surface; and a plurality of ports, each of the ports opening into a respective one of the runners;

a perimeter wall protruding from the outer surface of the runners and surrounding the ports;

a bottom surface encircled by the perimeter wall and including, a plurality of peaks, each of the peaks is formed by a portion of the outer surface of a respective one of the runners, and a plurality of valleys, each of the valleys is located between a respective pair of the peaks;

a cover adjacent the perimeter wall and opposing the bottom surface, the cover including an inner surface; and a plurality of projections protruding from one of the inner surface and the bottom surface, wherein the peaks, the valleys, and the projections form a labyrinth that extends across a ventilation space bound by the bottom surface, the perimeter wall and the cover.

19. The intake manifold according to claim 18, wherein the projections protrude from the inner surface and include a sloped surface that is spaced away from and inclined with respect to the inner surface.

20. The intake manifold according to claim 18, wherein the projections protrude from the bottom surface and include, a plurality of first projections, a pair of the first projections are located in one of the valleys, and a plurality of second projections, at least one of the second projections is located on a respective one of the peaks.

* * * * *